No. 12,416. REISSUED DEC. 5, 1905.

L. QUANCHI.

MACHINE FOR MAKING MATRIX BLANKS.

APPLICATION FILED SEPT. 2, 1905.

3 SHEETS—SHEET 1.

Witnesses
Julian T. Hooter.
Geo. A. Hoffman.

Louis Quanchi Inventor
By his Attorney C. W. Edwards

No. 12,416. REISSUED DEC. 5, 1905.

L. QUANCHI.

MACHINE FOR MAKING MATRIX BLANKS.

APPLICATION FILED SEPT. 2, 1905.

3 SHEETS—SHEET 2.

Witnesses
Julian Hooter
Geo. A. Hoffman.

Louis Quanchi Inventor
By his Attorney C. V. Edwards.

No. 12,416. REISSUED DEC. 5, 1905.
L. QUANCHI.
MACHINE FOR MAKING MATRIX BLANKS.
APPLICATION FILED SEPT. 2, 1906.
3 SHEETS—SHEET 3.
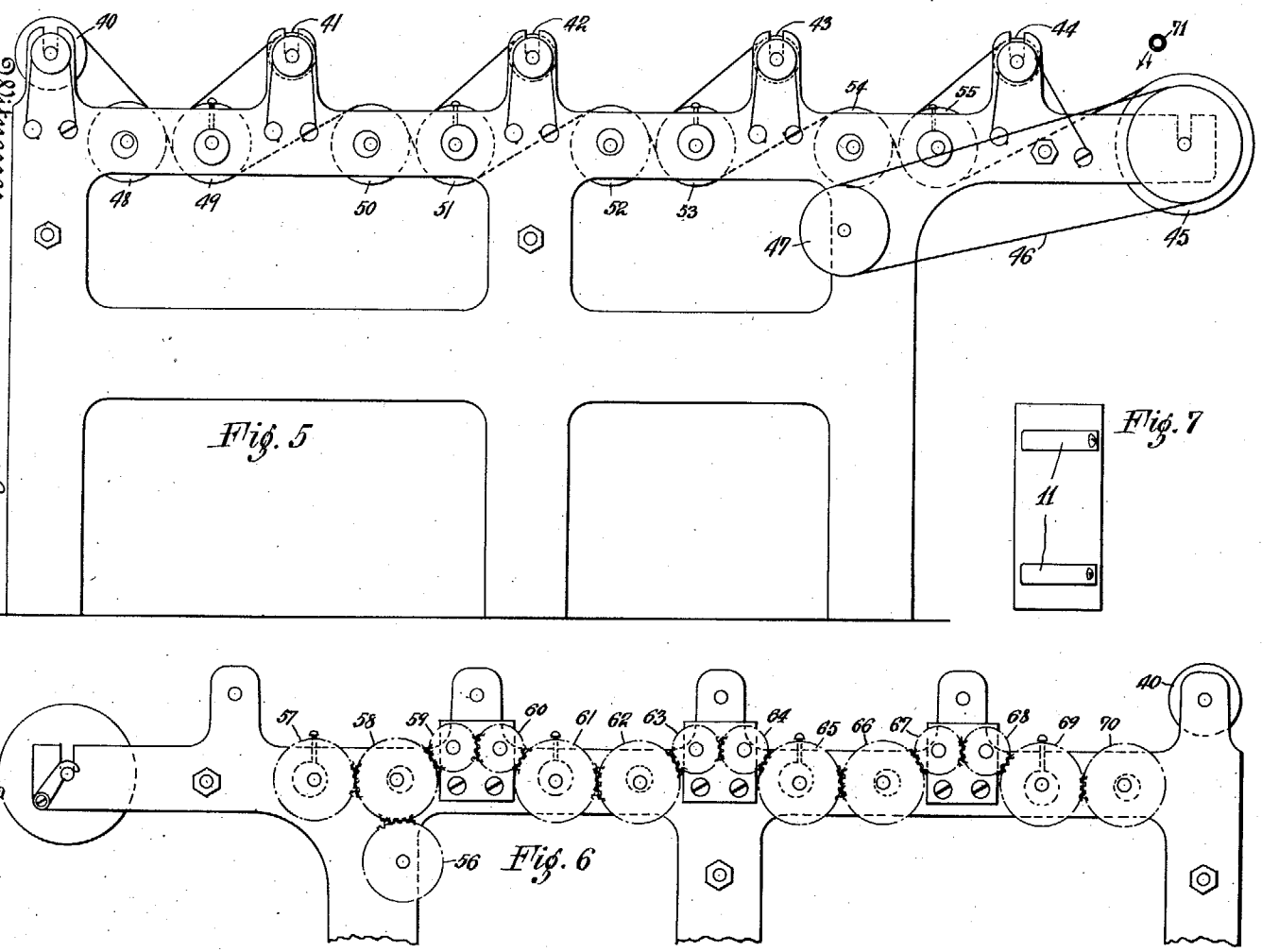
Witnesses
Julian Hooster
Geo. A. Hoffman.
Louis Quanchi
By his Attorney C. N. Edwards.
Inventor

UNITED STATES PATENT OFFICE.

LOUIS QUANCHI, OF YONKERS, NEW YORK.

MACHINE FOR MAKING MATRIX-BLANKS.

No. 12,416. Specification of Reissued Letters Patent. Reissued Dec. 5, 1905.

Original No. 798,047, dated August 22, 1905. Application for reissue filed September 2, 1905. Serial No. 276,910.

*To all whom it may concern:*

Be it known that I, LOUIS QUANCHI, of Yonkers, New York, have invented new and useful Improvements in Machines for Making Matrix-Blanks, of which the following is a specification.

This invention relates to machines for making matrix-blanks, and has for its objects to provide a machine for making in one operation a matrix-blank composed of any desired number of sheets pasted and pressed together.

In the art to which this machine relates it is ordinarily the custom, so far as I am aware, to build up the matrix-blanks by hand, commencing with the back and pasting thereto by hand as many additional sheets as may be desired.

According to this invention I have provided a machine adapted to hold the requisite number of rolls of paper and operating to paste as many sheets together as may be necessary to form the matrix-blank.

The invention also comprehends novel pasting mechanism and various other improvements, all of which will be more fully described in connection with the accompanying drawings, and pointed out in the claims.

Figure 1:
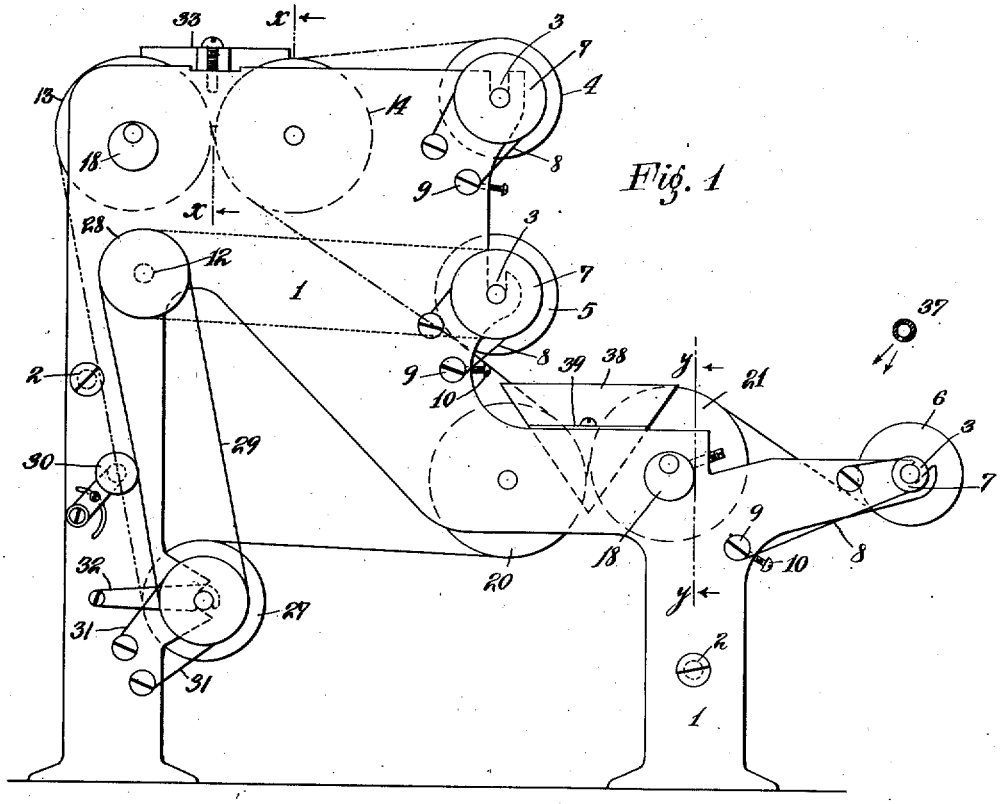
Figure 3:
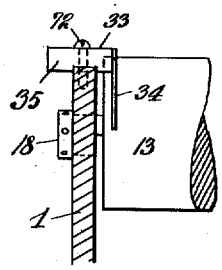
Figure 4:
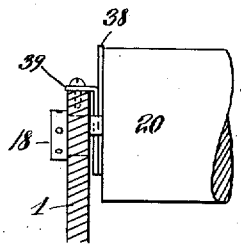
Figure 2:
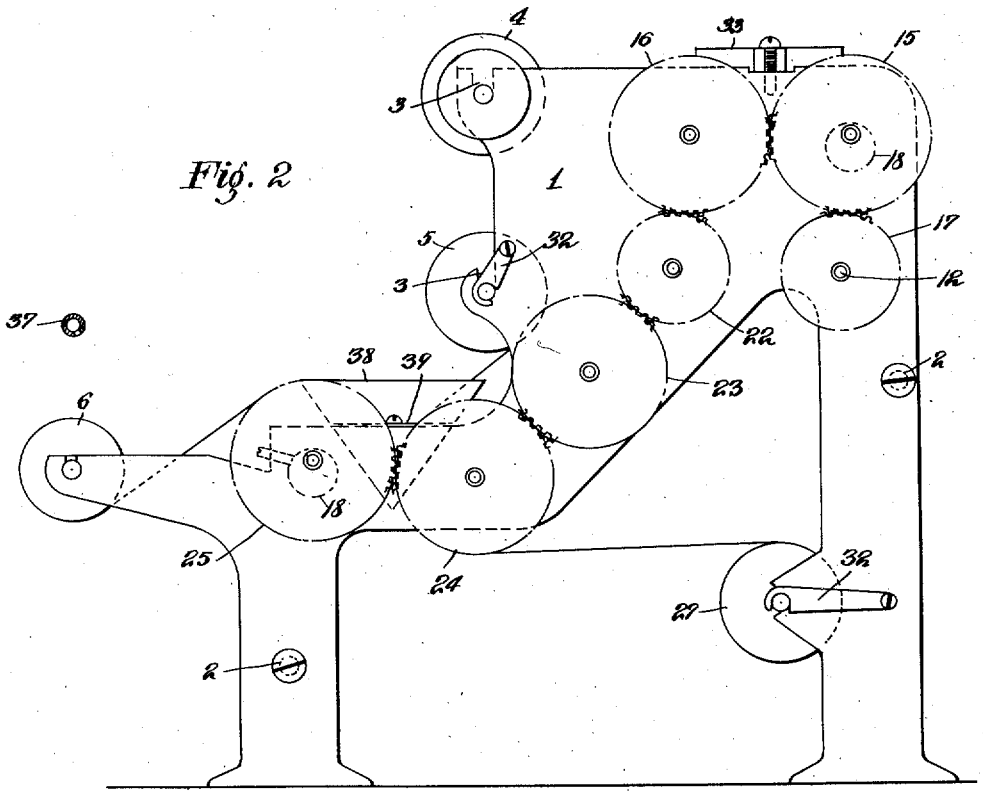

Referring to the drawings, Figure 1 is a side elevation of a machine embodying my invention. Fig. 2 is a similar view seen from the opposite side, showing the driving connections. Fig. 3 is a detail view of the adjustable side guide and paste-retainer. Fig. 4 is a detail of a side guide and paste-retainer for a constant width of sheet. Fig. 5 is a side view of a modification. Fig. 6 is a similar view seen from the opposite side; and Fig. 7 is a detail of one of the rollers, showing the attaching devices.

1 indicates the side-frame of the machine, rigidly connected by cross-rods 2, upon which the operative parts are mounted. Matrix-blanks are ordinarily built up of one sheet of heavy paper, called the "back," and several sheets of tissue-paper pasted and pressed together, and I will describe the invention referring to the back, in conjunction with the tissue, though it will be obvious that the invention is not to be confined to the use of webs of dissimilar thicknesses, since the various mechanisms can be independently adjusted according to the thickness and width of the webs to be pasted together. Referring to Figs. 1 and 2, mounted in trunnions 3 on the frame are supply-rollers 4 6, each having a spindle on which is mounted a tension-pulley 7, around which passes a tension-cord 8, fastened at one end and having its other end wound around stub-shafts 9, which can be turned and set by suitable set-screws 10 to vary the tension on the roller and prevent too rapid unwinding. 5 and 27 are winding-up rolls adapted to be alternatively driven by belt 29 and having similar tension devices for use when these rolls act as supply-rolls. Each of the rollers 4, 5, 6, and 27 is provided with suitable clips 11, Fig. 7, for holding the end of the web. The pasting and pressure rollers are mounted in pairs and suitably geared together from the driving-shaft 12. 13 14 are pasting-rollers geared together by gears 15 16 and driven by gear 17 on driving-shaft 12. One of the rollers of each pair is mounted in eccentric bearings, as 18, in order to permit of an adjustment of the distance between them, this adjustment permitting the employment of webs of different thickness and also controlling the amount of paste applied to the web as it passes between the rolls. The other pair of paste-rolls 20 21 are similar to the rolls 13 14 and are driven in synchronism with rolls 13 14 from gear 16 through gears 22 23 24 25. Pulley 28 on shaft 12 drives belt 29 and rollers 5 or 27, which are equidistant from 28, and 30 is an adjustable idler for controlling the tension of driving-belt 29, so that as the diameter of the winding-up roll increases the web will not be pulled so hard as to break it, as would happen unless the belt could slip. 31 is the tension device for the roll 27, similar to that above described for the supply-rolls. The roll 27 is mounted similarly to the supply-rolls, pivoted latches 32 being provided in all cases to hold the rolls in position while in operation. Mounted on the frame between the rolls 13 and 14 at opposite ends are adjustable edge guides and paste-retainers 33, each comprising a pointed portion 34, adapted to project between the rolls, and an angular slotted extension 35, which bears on the frame and is adjustable to follow the adjustment of the rolls and also transversely by means of a set-screw 72. It will be obvious that similar devices may be applied to the other rolls, and it is my intention to so apply them in case the paper used in the machine is narrower than the rolls. In case one layer is narrow and the other wide I can adjust the guides 33 correspondingly. I have shown the rolls 20 21 as provided with triangular edge guides 38, which have a shoulder 39, by which they are attached to the frame. As these guides are placed between the ends of the rollers and the frame they need not be adjustable; but in order to retain the paste they are set up close to the ends of the rolls. In this space formed by the end guides and the rolls I place the paste, and by adjusting the rolls toward and from each other according to the thickness of the paper the amount of paste applied to the web can be regulated. It will also be seen that the adjustable end guides can be set in for a narrow web, which can thus be pasted to a wide sheet running between the guides 38 without applying more paste than is necessary to cause the webs to adhere.

In pasting the tissue-paper used for matrix-blanks it is impracticable to apply the paste by one mechanism and then subsequently apply and press the other sheet thereto, because as soon as the tissue is wet it loses all of its strength, and any attempt to feed it by rolls when wet results in breaking the web. It is also impracticable to depend upon the pull of the winding-up rolls to feed the web from the supply-rolls for the same reason, and hence it is necessary to positively drive all of the pasting and pressing rolls. In order to avoid breaking the web by pasting it before it is pressed, I use the simultaneous pasting and pressing mechanism before described and am thus enabled to paste and press two webs together without danger of breaking either of them. This freedom from breakage of the web while wet is due to the fact that the roll forms a support for the wet web.

The machine shown in Figs. 1 and 2 is adapted for use in small plants where the desired number of plies can be built up by several successive pasting and pressing operations, each operation simultaneously pasting and pressing two webs together, and I will now describe how a three-ply web may be made in two operations without requiring other adjustment than the shifting of the driving-belt 29. From roll 6 a web, which may, for example, be the back, passes over roll 21 between it and roll 20 to winding-up roll 27, which is driven by belt 29 from shaft 12. At the same time a web, which may be of tissue, from roll 5 is pasted to the web from roll 6 by rolls 20 and 21 and wound up on roll 27. At this time the supply-roll 4 is not in use. After the webs on rolls 5 and 6 have been wound up on roll 27 the belt 29 is shifted to drive-roll 5, and the webs from rolls 4 and 27 are led between rolls 13 and 14 and wound up on roll 5, as shown in dotted lines, Fig. 1. By then repeating the operations a web of as many plies as desired may be made on one machine. Inasmuch as the web which is pasted and pressed by the rolls 13 and 14 is somewhat thicker than that pasted and pressed by rolls 20 and 21, the former may be set for this increased thickness and left so, thus necessitating only the shifting of the driving-belt 29 to make a three-ply web in two operations. The material for the back as delivered in a roll by the manufacturer may be placed in the trunnions of the roll 6 and dampened and wound on either of the winding-up rolls 5 or 27 by means of the belt 29, a perforated pipe 37 supplying a fine jet of water or steam in any well-known manner.

Referring now to Figs. 5 and 6, I show a machine for forming a matrix-blank of five plies. 40 41 42 43 44 are supply-rolls carried in trunnions and provided with tension devices, as before described. 45 is the winding-up roll driven by belt 46 from the driving-pulley 47, connected to any suitable source of power. 48 49 50 51 52 53 54 55 are pairs of pasting and pressing rolls corresponding, respectively, to the supply-rolls 40, 41, 42, 43, and 44. Each pair of pasting and pressing rolls is provided with end guides, as before described. Mounted on the shaft of driving-pulley 47 is a gear 56, which drives the pasting-rollers through the train of gears 57 58 59 60 61 62 63 64 65 66 67 68 69 70 in a well-known manner. The pasting-rolls are adjustably mounted in eccentric bearings, as before described, in order to compensate for varying thicknesses of web and to regulate the amount of paste and pressure applied. Ordinarily in practice the back web will be on the roller 40 and will pass through the other rolls to receive successively the tissues. It will be seen that the back may have tissues applied to both sides, if desired, by suitably disposing it relatively to the tissues. This form of the invention is intended for large plants where the full capacity of the machines can be used, and a dampener 71 may be located near the winding-up roll 45, so that the back as delivered by the manufacturer may be dampened and wound on roll 45 before pasting.

In some instances matrix-blanks comprise more than one back in conjunction with the tissues, and such a matrix-blank may be made on this machine as well as the ordinary one having a single back and one or more tissues.

It will be understood that by the term "paste" used herein I mean to include as well as the ordinary adhesive various adhesive compositions, including that ordinarily used in making up matrix-blanks.

It will be understood that I do not restrict myself to the precise construction I have herein described nor to any particular character of material used, as modifications and changes may be made without departing from the spirit of the invention.

Having thus described my invention, I declare that what I claim as new, and desire to secure by Letters Patent, is—

1. In a machine for making matrix-blanks, the combination with means for dampening a web, of means for supplying a facing-web thereto and simultaneously pasting and pressing said webs together while they are supported, means for thereafter simultaneously pasting and pressing one or more additional webs thereto, and means for positively driving said pasting means in order to relieve the tension on the web, substantially as described.

2. In a machine for making matrix-blanks, the combination with a plurality of web-supplying devices, of means for simultaneously pasting and pressing two of said webs together while supported, means for winding up said pasted web, a second simultaneous pasting and pressing means adapted to paste a web from another of said web-supplying devices to said pasted web, means for winding up said web, and means for positively driving said pasting and winding-up devices whereby to relieve the tension on the web, substantially as described.

3. In a machine for making matrix-blanks, the combination with a plurality of web-supplying devices, of means for simultaneously pasting and pressing two of said webs together while supported, means for winding up said pasted web, a second simultaneous pasting and pressing means adapted to paste a web from another of said web-supplying devices to said pasted web, means for winding up said web, and means whereby said winding-up means act alternatively as web-supply devices, substantially as described.

4. In a machine for making matrix-blanks, the combination with two pairs of positively-driven rolls, each provided with paste-retaining ends, two supply-rolls, two winding-up rolls and a driving-shaft, of means adapted to drive either of said winding-up rolls singly, whereby the other, and one of said supply-rolls are adapted to feed each a web to one of said pairs of pasting-rolls and thence to the driven winding-up roll, substantially as described.

In testimony whereof I affix my signature in the presence of two witnesses.

LOUIS QUANCHI.

Witnesses:

JULIAN S. WOOSTER,

GEO. A. HOFFMAN.